Figure 1:
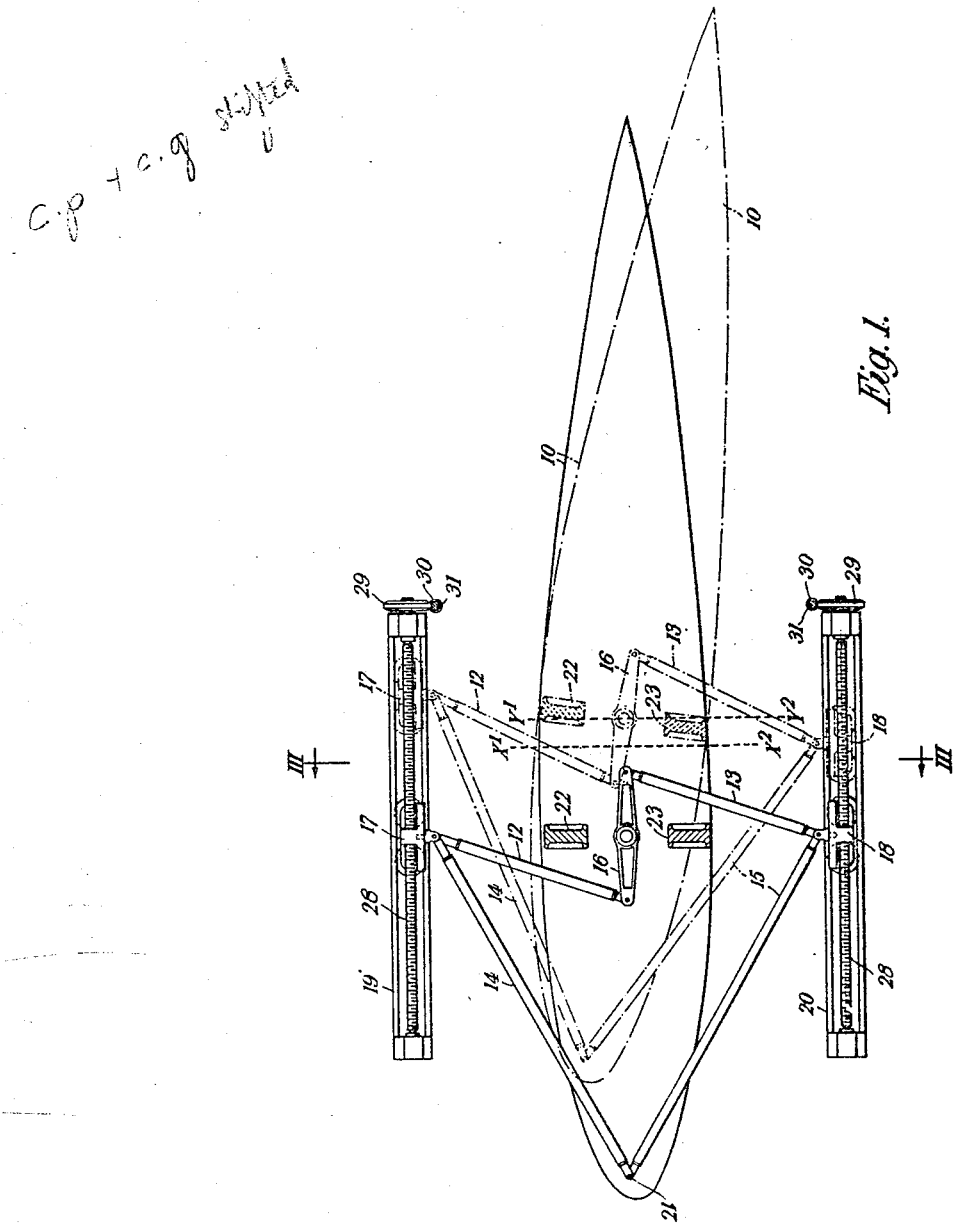

April 18, 1950     B. N. WALLIS     2,504,767
AIRCRAFT WITH ADJUSTABLE WINGS
Filed March 31, 1947     5 Sheets-Sheet 1

Inventor
B. N. Wallis
By Watson, Cole, Grindle & Watson

April 18, 1950   B. N. WALLIS   2,504,767
AIRCRAFT WITH ADJUSTABLE WINGS
Filed March 31, 1947   5 Sheets-Sheet 4

Inventor
B. N. Wallis
By Watson, Cole, Grindle & Watson

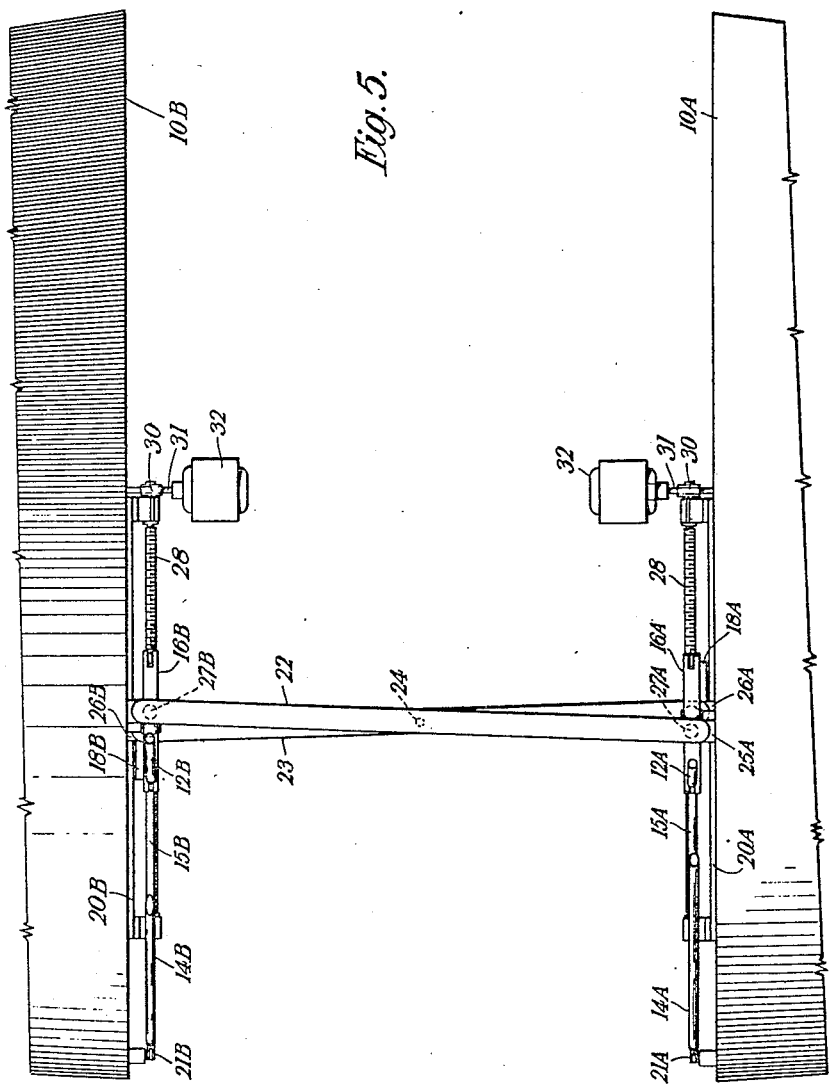

Patented Apr. 18, 1950

2,504,767

UNITED STATES PATENT OFFICE 2,504,767

AIRCRAFT WITH ADJUSTABLE WINGS

Barnes Neville Wallis, Weybridge, England, assignor to Vickers-Armstrongs Limited, London, England Application March 31, 1947, Serial No. 738,362
In Great Britain March 28, 1946

3 Claims. (Cl. 244—46)

1

The object of this invention is to provide improved means for mounting the body of an aeroplane upon the wing.

The invention provides means whereby the body of an aeroplane may be mounted upon and attached to the wing in such manner that the relative position of wing and body may be adjusted during flight about the spanwise axis of the wing (whether both port and starboard wing-sections be moved in unison or differentially), or in a fore-and-aft direction such that the centre of pressure of the wing is shifted in relation to the centre of gravity of the aircraft.

The invention also includes a wing/body mounting whereby adjustment can be obtained either about an axis mutually perpendicular to the longitudinal axis of the body and the spanwise axis of the wing, or in a vertical direction.

Any or all of the forms of adjustment above referred to may be performed either automatically in response to the reactions of an automatic pilot, or manually in the course of normal control by the pilot.

One form of mounting provided by this invention is a mechanical linkage comprising in relation to each wing-section (a) pivotal links respectively connecting points thereon before and behind its spanwise axis to anchorages on the body above and below the wing (or vice versa), (b) a lever pivoted at an intermediate point in its length about said spanwise axis, and (c) pivotal links respectively connecting the free extremities of said lever to said anchorages; means are provided whereby said anchorages may be selectively adjusted in relation to the body in a fore-and-aft direction, and the arrangement is such that required control adjustments of the relative positions of wing and body may be effected by longitudinal adjustment of the appropriate anchorages.

An alternative and simplified form of such mechanical linkage has both upper and lower movable anchorages connected by pivotal links to the same point on the wing-section, either before or behind the spanwise axis.

The first-mentioned form of wing/body mounting has two linkages attached to the respective wing-sections at the inboard ends thereof, conveniently within the body, and the anchorages by which the linkages are connected to the body may be constituted by rollers running in channel-tracks fixed longitudinally therein, one above and one below each wing-section. Thus, each wing-section is suspended from a roller anchorage movable in the upper track at that side of the

2 body, and supported by a roller-anchorage in the corresponding lower track, with capability of rotating about its spanwise axis in either direction, with or without a relative adjustment of body to wing in a fore-and-aft direction.

A purely rotational adjustment of a wing-section, where it is required to vary the angle of incidence without movement of the centre of pressure, is achieved by moving both upper and lower roller-anchorages simultaneously in opposite directions by the same extent. Adjustments of this nature may be required for ordinary control movements not accompanied by a permanent change of speed, both wing-sections being rotated in the same direction for control in pitch and in opposite directions for control in roll.

Where the device is applied to an aeroplane without a conventional empennage, such as is described in United States Patent application Serial No. 672,249, now U. S. Patent No. 2,459,009, issued January 11, 1949, any variation in the angle of incidence of the wing to suit a permanent change in speed, whilst maintaining a constant angle of incidence of the fuselage, must be accompanied by an appropriate adjustment of the position of the centre of pressure of the wing in relation to the centre of gravity of the aircraft. This result may be achieved by traversing the roller-anchorages of the lower tracks, whilst those of the upper tracks remain stationary. (Alternatively, the upper anchorages may be adjusted whilst the lower anchorages remain stationary.)

Figure 2:
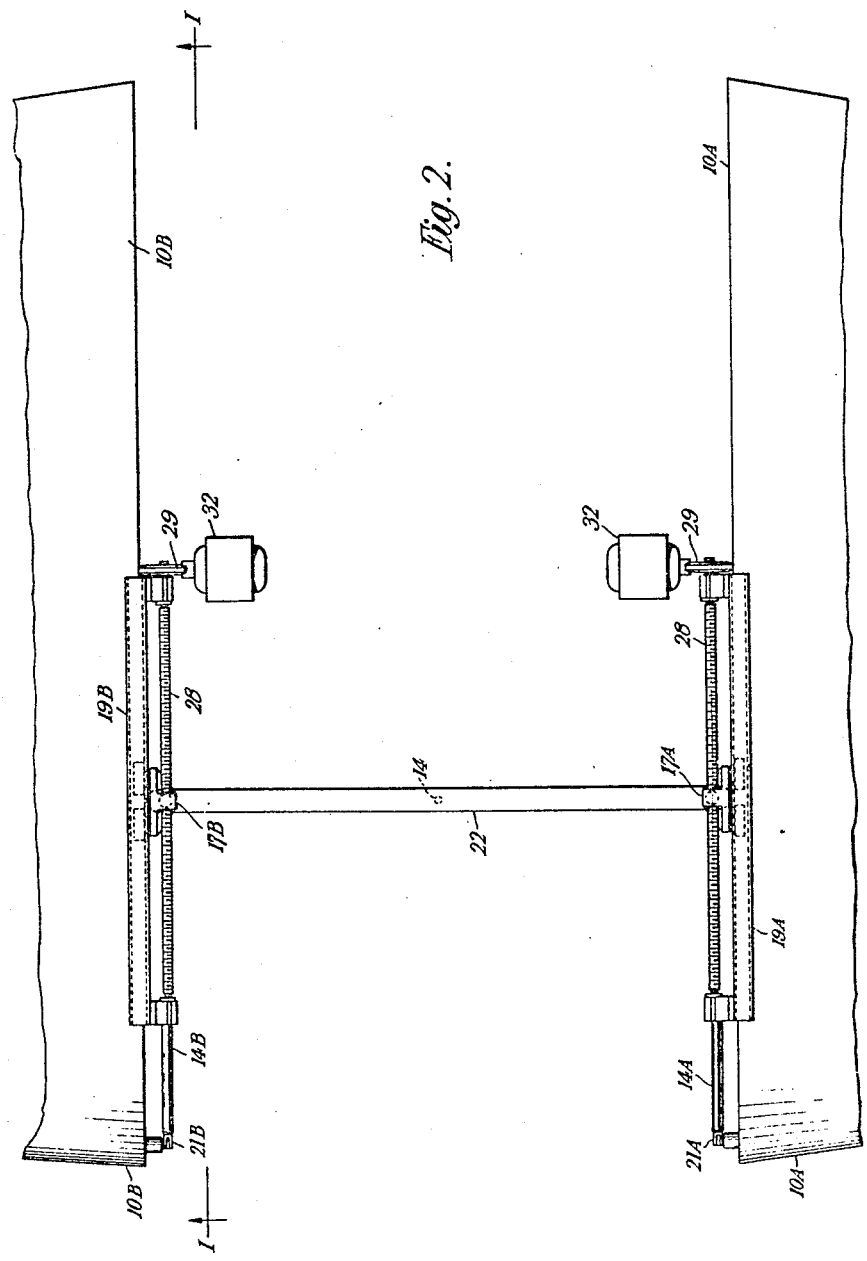
Figure 3:
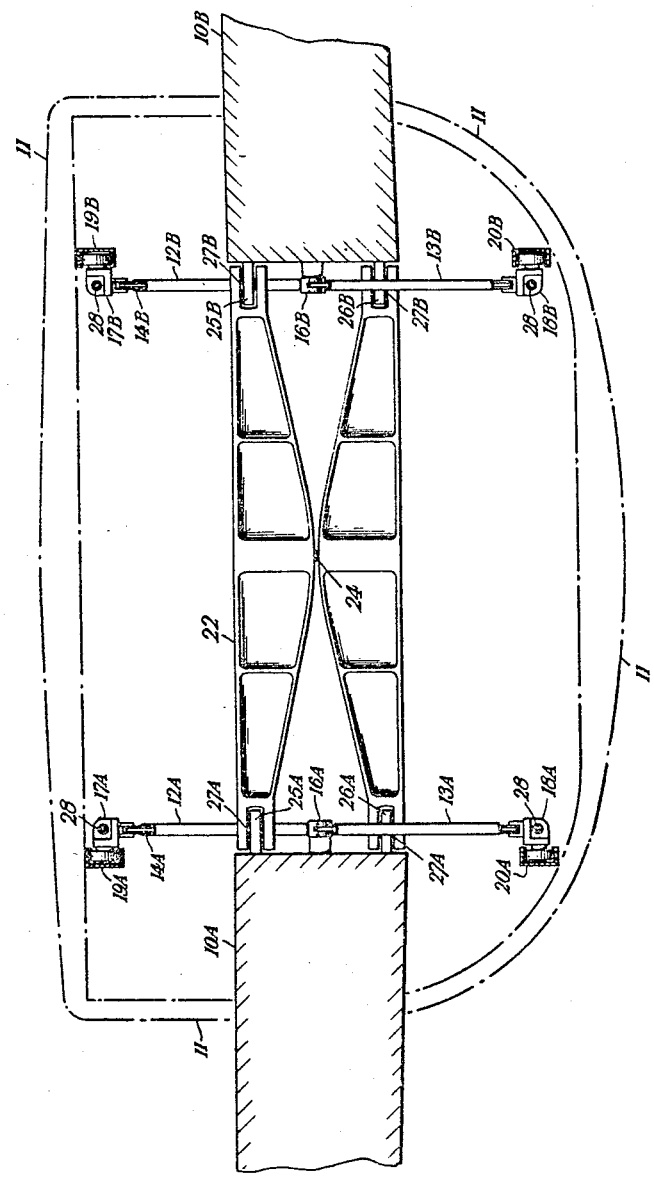
Figure 4:
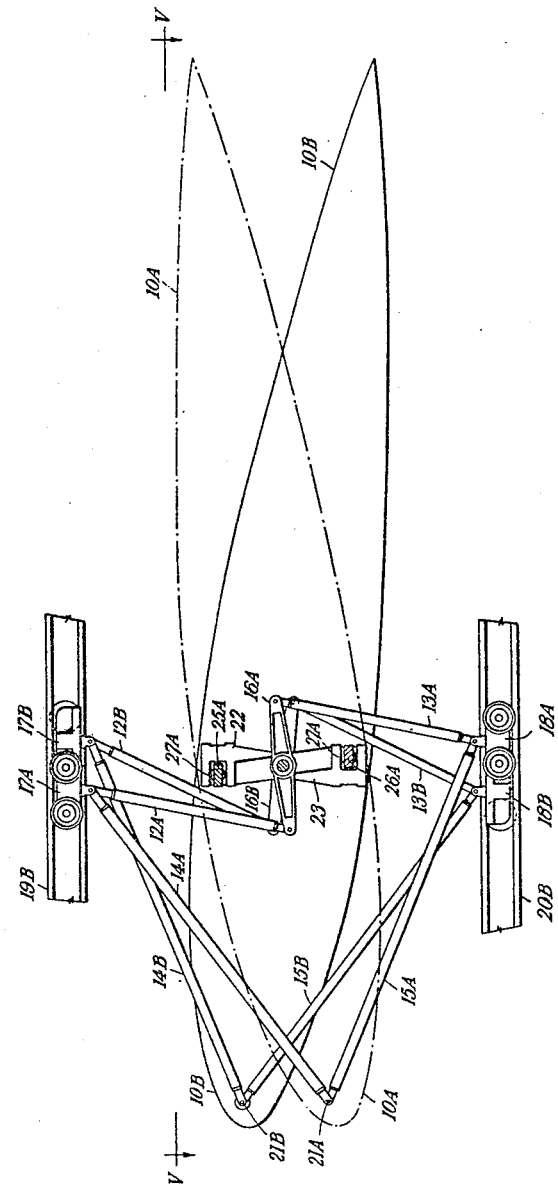

The constructional arrangement of this form of body/wing mounting may be more clearly understood by reference to the accompanying diagrammatic drawings, which illustrate the simplified and preferred form of linkage already referred to. In said drawings, Fig. 1 is a sectional elevation of the mounting, taken on the line I—I of Fig. 2, which is a fragmentary plan view thereof. Fig. 3 is a transverse section taken on the line III—III of Fig. 1. Fig. 4 is a similar view to Fig. 1 depicting the relative positions which are assumed by the parts when the wing-sections are adjusted differentially about their spanwise axes, and Fig. 5 is a sectional plan taken on the line V—V of Fig. 4.

In the drawings the reference numeral 10 denotes a sectional outline of a wing-section and 11 the fuselage or body. Each wing-section is supported in relation to the body through the medium of a mechanical linkage comprising the pivotal members 12, 13, 14, 15 and the lever 16. The lever 16 is pivoted at its midpoint to the butt of the wing-section so as to be capable of movement about the spanwise axis thereof, and its extremities are linked by the members 12, 13 respectively to anchorages constituted by roller-carriages 17 and 18 which are arranged to run in channel-tracks 19 and 20 mounted within the body respectively above and below the wing. A point 21 near to the leading edge of the wing-section is a common pivot for link-members 14 and 15 which are also connected to said roller-carriages, so that the wing-section is suspended by the carriage 17 and supported by the carriage 18 with capability of rotating about its spanwise axis in either direction and/or of being adjusted in relation to the body in a fore-and-aft direction.

In Figs. 2 to 5 where both wing-sections and their respective linkages are shown, the parts are distinguished by adding the suffixes A and B to the reference numerals relating to the port and starboard wing-sections respectively.

All bending, torsional and shear forces between the two wing-sections 10A, 10B, are transmitted directly by means of the beams 22, 23 which are connected by a single pin 24 so as to be capable of relative pivotal movement and also a slight degree of relative movement along the axis of the pin. The beam 22 is connected at its extremities to brackets 25A, 25B incorporated in the structure of the wing-sections near to their upper surfaces, and the beam 23 is similarly connected to the wing-section structures near to their lower surfaces by the brackets 26A, 26B. Each of said connections comprises a ball-joint, as at 27A, 27B.

Each of the roller-carriages 17A, 17B is capable of being traversed along its channel-track by suitable power- or hand-operated mechanism. A convenient form of such mechanism shown in the drawings by way of example comprises in respect of each roller-carriage a lead-screw 28 which co-acts with a nut (not shown) incorporated in the carriage so that when said screw is rotated the carriage will move in the corresponding direction. At the end of each lead-screw 28 is fixed a worm-wheel 29 which meshes with a worm 30 on the shaft 31 of an electric motor 32, by which the roller-carriage is driven.

The angle of incidence of the entire wing may be adjusted without an accompanying movement of the centre of pressure by moving both upper and both lower roller-carriages 17, 18 simultaneously in opposite directions, by the same extent, so that the spanwise axis of the wing remains stationary. Such an adjustment may be required for control in pitch without a permanent change of speed, and it will be understood that it will be effected by switching the four electric motors 32 so that the upper two drive the upper lead-screws 28 in one direction whilst the lower two drive the lower lead-screws 28 in the opposite direction.

The relative positions of the parts of the two linkages when the wing-sections are adjusted differentially for control in roll may be seen in Figs. 4 and 5. In this case the upper and lower motors 32 of the wing-section 10A have been switched to drive the roller-carriage 17A forward and the roller-carriage 18A aft by the same extent, rotating the wing-section 10A about its spanwise axis so as to decrease its angle of incidence. Similarly, the motors of the wing-section 10B have been switched to drive the roller-carriage 17B aft and the wing-section 10B so as to increase its angle of incidence.

Should it be necessary to adjust the position of the centre of pressure of the wing in relation to the centre of gravity of the aircraft, as for example in the case of a variation in the angle of incidence of the wing to suit a permanent change of speed, though maintaining a constant angle of incidence of the body, the upper roller-carriages may be traversed in the appropriate direction whilst the lower roller-carriages remain stationary. Alternatively, the same result can be achieved by a movement only of the lower roller-carriages. In the example illustrated in Fig. 1 by the chain-dotted lines, the upper roller-carriages 17A, 17B have been traversed rearwardly whilst the lower carriages 18A, 18B have been held stationary; as will be seen, the effect is to increase the angle of incidence of the wing and at the same time to move the wing so that the spanwise axis is shifted bodily by the extent denoted by the distance between the dotted lines $X^1X^2$ and $Y^1Y^2$.

It should be stated that the degrees of movement of the wing-sections illustrated in the chain-dotted portion of Fig. 1, and in Figs. 4 and 5, are exaggerated for the sake of clarity. In practice, very small degrees of movement will be sufficient for the execution of all necessary control manoeuvres and adjustment of longitudinal trim.

The traversing adjustments of the several roller-carriages 17, 18 requisite to produce the wing-section movements appropriate to control in pitch and roll are executed selectively through suitable means (not shown) by movement of the pilot's control column, steering-wheel (or its equivalent) and rudder-bar. Variation in the relative positions of the centre of pressure of the wing and the centre of gravity of the aircraft will be effected by a suitable auxiliary trimming control organ arranged to switch either the upper pair or the lower pair of motors 32 in the appropriate fashion.

What I claim as my invention and desire to secure by Letters Patent is:

1. An aeroplane comprising a body, a wing constituting port and starboard wing-sections, and means for mounting each of said wing-sections upon said body comprising pivotal links connecting a point on the wing-section remote from its spanwise axis with anchorages on the body above and below the wing, a lever mounted on the wing-section at an intermediate point in its length to pivot about an axis extending spanwise of said wing section, pivotal links respectively connecting the free extremities of said lever to said anchorages, and means for selectively adjusting said anchorages in relation to the body in a fore-and-aft direction, the arrangement being such that required control adjustments of the relative positions of wing and body may be effected during flight by longitudinal movement of the appropriate anchorages, to effect adjustments of the wing-sections about the spanwise axis of the wing selectively in unison or differentially and to effect adjustments of the wing-sections in a fore-and-aft direction to permit the center of pressure of the wing to be shifted in relation to the center of gravity of the aeroplane.

2. An aeroplane as claimed in claim 1 wherein the movable anchorages are constituted by roller carriages guided for traversing movement longitudinally of the body in tracks, fixed in the latter above and below the wing, and having means for effecting such traversing movement.

3. An aeroplane as claimed in claim 1 wherein the movable anchorages are constituted by roller carriages guided for traversing movement longitudinally of the body in tracks, fixed in the latter above and below the wing, and having power driven screw and nut mechanism associated with the pilot's control organs for effecting such traversing movement of the roller carriages.

BARNES NEVILLE WALLIS.

REFERENCES CITED

The following references are of record in the file of this patent:

UNITED STATES PATENTS

| Number | Name | Date |
| --- | --- | --- |
| 1,309,961 | Rippenbein | July 15, 1919 |
| 1,819,948 | Diago | Aug. 18, 1931 |
| 2,152,981 | Taylor | Apr. 4, 1939 |
| 2,362,224 | Roseland | Nov. 7, 1944 |